Dec. 20, 1966   H. L. RATLIFF, JR   3,293,358
CATHODE RAY TUBE OPTICAL VIEWING DEVICE FOR REPRODUCING WIDE
ANGLE STEREOSCOPIC STEREOPHONIC MOTION PICTURES
Filed Jan. 10, 1963                              5 Sheets-Sheet 4

INVENTOR
Harvey L. Ratliff Jr.

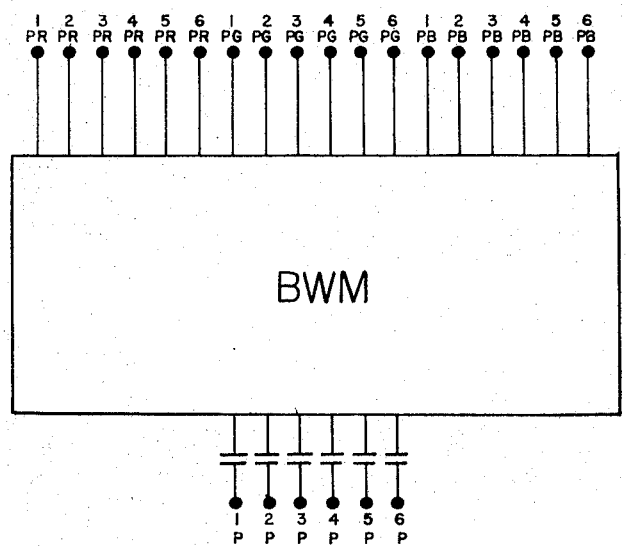
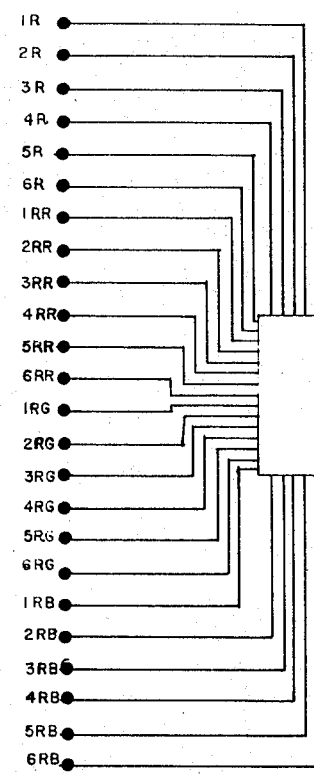
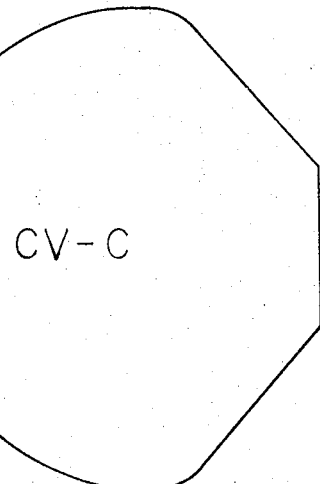
FIG. 10
FIG. 11
INVENTOR
Harvey L. Ratliff Jr.

United States Patent Office 3,293,358
Patented Dec. 20, 1966

3,293,358
CATHODE RAY TUBE OPTICAL VIEWING DEVICE FOR REPRODUCING WIDE ANGLE STEREOSCOPIC STEREOPHONIC MOTION PICTURES
Harvey L. Ratliff, Jr., Amarillo, Tex., assignor of one hundred percent to Jetru Inc., Amarillo, Tex.
Filed Jan. 10, 1963, Ser. No. 250,562
5 Claims. (Cl. 178—6.5)

A brief summary of the invention is as follows:

The converting of electrical signals into stereophonic sound and wide angle stereophonic motion pictures upon the phosphorescent screen of a cathode ray tube; said screen also being the screen of a wide angle stereoscopic viewer having an associated reticle or the like; there being up to many thousand separate cathode ray tube wide angle stereoscopic viewers showing said motion picture simultaneously and individually for individual viewing observers.

FIGS. 1 and 11 are designed to diagrammatically illustrate the cathode ray tube optical viewing device of the present invention.

FIGS. 2–4, 6, 8, 9, 10 are designed to diagrammatically illustrate a theatrical arrangement for using the viewers of FIGS. 1 and 11 contemplated for the present invention.

Cathode ray tube wide angle stereoscopic viewer CV of FIG. 1 will be explained. There is a high positive potential placed on anode A–3 of CV in FIG. 1 and an ample negative bias placed on grid G–2 of CV, FIG. 1 by means of bias resistor RE–2 or a D.C. source or by other means. Pick up electrodes 3R and 4R are coupled to output electrodes in a well known manner. Pick up electrodes 5R and 6R, are coupled to output electrodes. as described in my copending application Serial No. 250,564 filed Nov. 15, 1962. Coil F–2' of FIG. 1 varies the magnetic flux produced in conjunction with plates P–2 of FIG. 1 and coil F–1' of FIG. 1 varies the magnetic flux produced in conjunction with plates P–1 in such a way electron beam eb of FIG. 1 scans phosphorescent screen S–2 of FIG. 1 in a manner identical to the iconoscopic type devices recording the scenes.

Pick up electrodes 1R and 2R are coupled to output electrodes as described in my copending application Serial No. 250,564 filed Nov. 15, 1962. The iconoscopic type signals are coupled to G–2 in a well known manner to velocity modulate eb' of an iconoscopic type device used in conjunction with the present invention.

Figure 1:
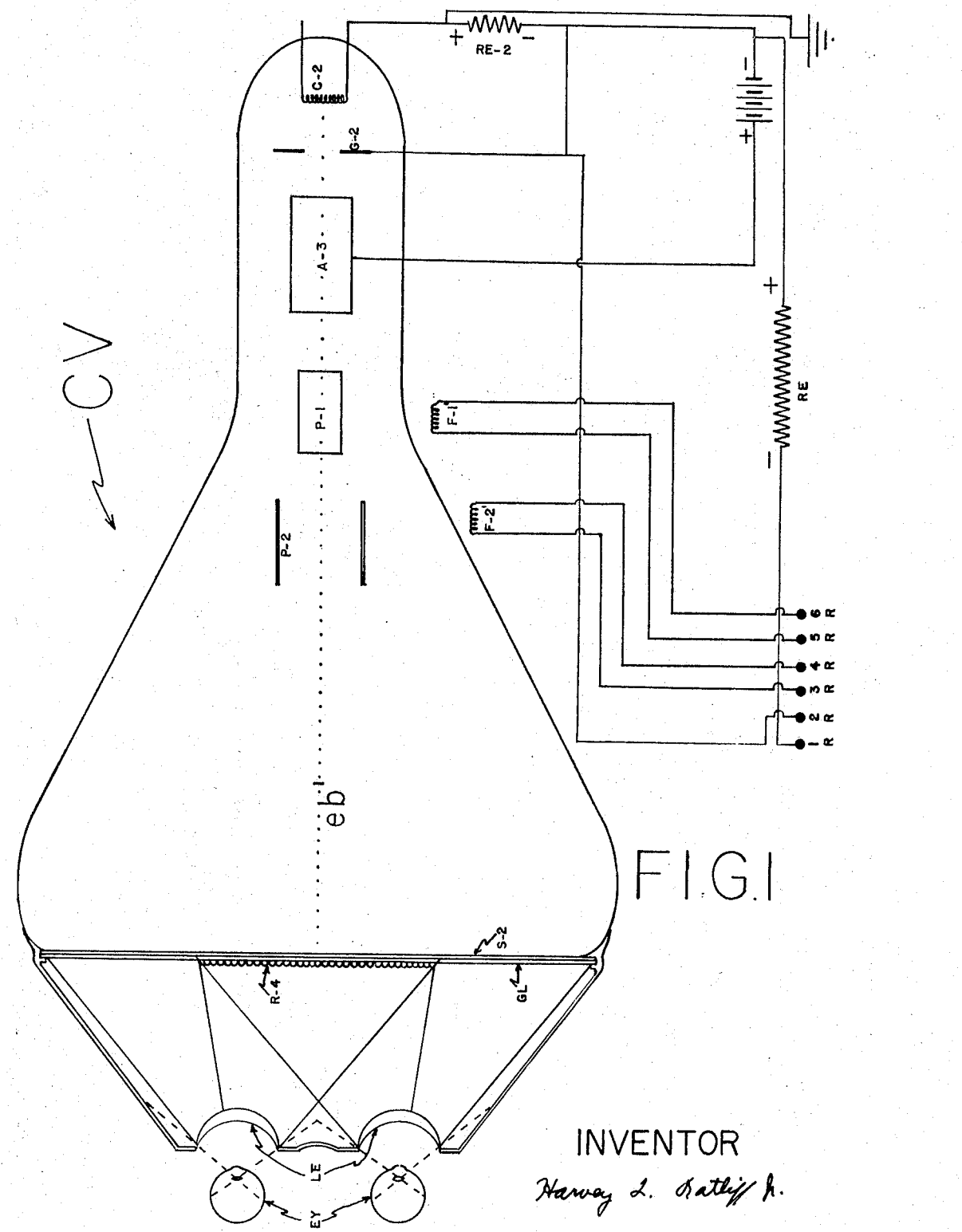
Figure 5:
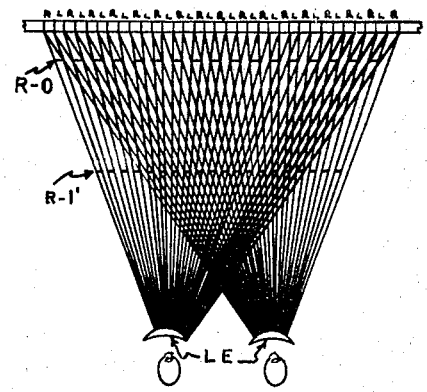
FIGS. 5 and 7 are designed to show some principles involved in the viewer of FIGS. 1 and 11.
Figure 7:
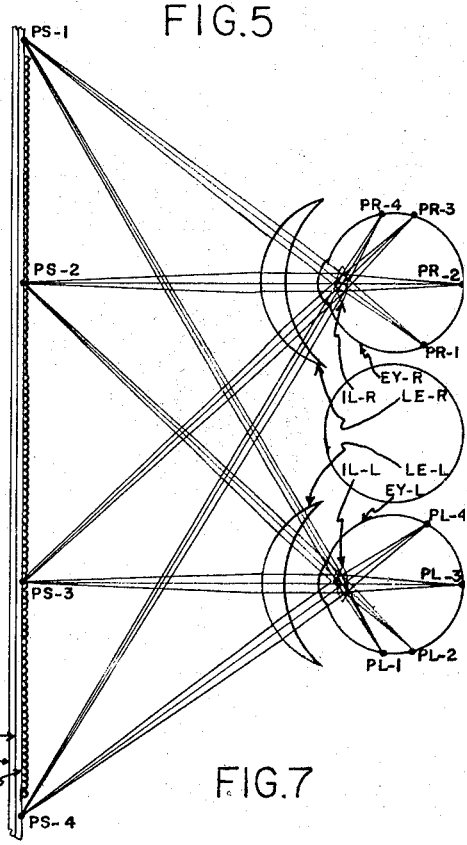

The eyes, EY of FIG. 1, of the viewing observers will view the identical picture projected upon the projector side of screen. The vertical, long, and very narrow conjugately related strips of said right eye view and left eye view which are produced on the screen of the iconoscopic device by the projection of the right eye view and left eye view upon the screen through a reticle of that portion of the wide angle stereoscopic motion picture which is to be viewed with both the right and left eyes of the viewing observer, are identically reproduced on screen S–2 of FIG. 1. The scanning frame may, of course, need to be adjusted so that said conjugate strips are related exactly right to reticle R–4. Said adjusting may be done by altering the bias placed upon plates P–2 of FIG. 1. Said scanning frame must be such that the right eye of the viewing observer sees only that wide angle motion picture the right eye is supposed to see and the left eye of the viewing observer sees only that wide angle motion picture the left eye is supposed to see. The manner in which reticle R–4 works may also be better explained when FIG. 5 is observed. In this figure the reticle is labeled R–0. It is clear from observing FIG. 5 that due to reticle R–0 the right eye can see only the vertical long and very narrow strips labeled R that only the right eye is supposed to see and that the left eye can see only the vertical long and very narrow strips labeled L in conjugate relationship with said strips labeled R that only the left eye is supposed to see. Actually the width of each tubular strip of reticles R–0, and R–4 is much more narrow than is indicated in FIGS. 5 and 1 respectively. As indicated by FIG. 1 the reticle may be a series of long, parallel, connected, very thin converging lenses, which focus upon vertical lines rather than points. This gives the right eye a greater sensation that it is not viewing vertical strips of a wide angle motion picture but rather a continuous wide angle motion picture. The same is true for the left eye. Either reticle may be practical, however. It is here pointed out that the lenses LE of FIG. 1 may be of any practical type, but it is preferable that they are of a special type. Said special type may be explained better by the observation of FIG. 7. Lens LE–R of FIG. 7 must preferable be ground and set such that light rays leaving point PS–1 of FIG. 7 will be rendered parallel or very slightly divergent when viewed by lens 1L–R of a normal eye. Of course in the position of the right eye EY–R shown, PS–1 is not the center of view, but it is preferable that lens LE–R be ground or molded such that said rays leaving PS–1 will be rendered parallel to 1L–R when 1L–R is rotated such that PS–1 is said center of view although the distance between PS–1 and 1L–R is approximately the same whether or not 1L–R is thusly rotated. This same rule holds true for the rays leaving points PS–2, PS–3, and PS–4. In other words, lenses LE–L and LE–R are preferably ground and placed such that the rays leaving points PS–1, PS–2, PS–3 and PS–4 are all rendered parallel to the normal left and right eyes respectively or, of course, to a pair of eyes which are corrected by glasses to normal vision; thereby focusing on the left and right eyes retinas at points PL–1 and PR–1, PL–2 and PR–2, PL–3 and PR–3, and PL–4 and PR–4 respectively in such a manner to make it clear to eyes EY–L and EY–R that points PS–1, PS–2, PS–3 and PS–4 respectively, originate far behind screen S–2. Further lenses LE–L and LE–R are prefarably ground or molded such that rays leaving any point on screen S–2 would be rendered parallel before reaching 1L–L and 1L–R respectively; thereby making it clear to eyes EY–L and EY–R that the wide angle stereoscopic images formed upon screen S–2 originate from a source relatively far behind screen S–2. It is here pointed out that screen S–2 may have curvilinear surfaces in the peripheral areas in order to increase the angle of view of the viewing observer.

For color reproduction the signals recorded by the iconoscope type tubes are placed upon pick up terminals 1R, 2R, 3R, 4R, 5R, 6R, 1RR, 2RR, 3RR, 4RR, 5RR, 6RR, 1RG, 2RG, 3RG, 4RG, 5RG, 6RG, 1RB, 2RB, 3RB, 4RB, 5RB, and 6RB respectively by either conventional color transmitting and detecting means, reproduction of a tape recorder, or by direct coupling. There is a screen within CV–C of FIG. 11 which corresponds to screen S–2 of CV of FIG. 1. Upon said screen within CV–C is produced the same color image which was picked up on the iconoscope type equipment in a manner taught in my copending application 250,564, filed Nov. 15, 1962, said image being overlapped as was described hereabove for the black and white image. Within CV–C of FIG. 11 there is a reticle and a pair of viewing lenses which are identical to reticle R–4 and lenses LE of FIG. 1 and have the same optical relation with themselves, and with said screen within CV–C as do R–4, LE and S–2 of FIG. 1. In other words, the viewing portion of CV–C of FIG. 11 is the same as that of CV of FIG. 1. As was true of CV, the scanning frame of CV–C may, of course, need to be adjusted so that said conjugate strips are related exactly right to said reticle of CV–C, FIG. 11 which corresponds to R–4 of FIG. 1. Also, of course, the number of horizontal scans per vertical inch within the scanning frame of 1WR, 1WG, 1WB and CV–C will need to be greater. Of course the picture frame upon S–2 of FIG. 1 may be larger.

Figure 2:
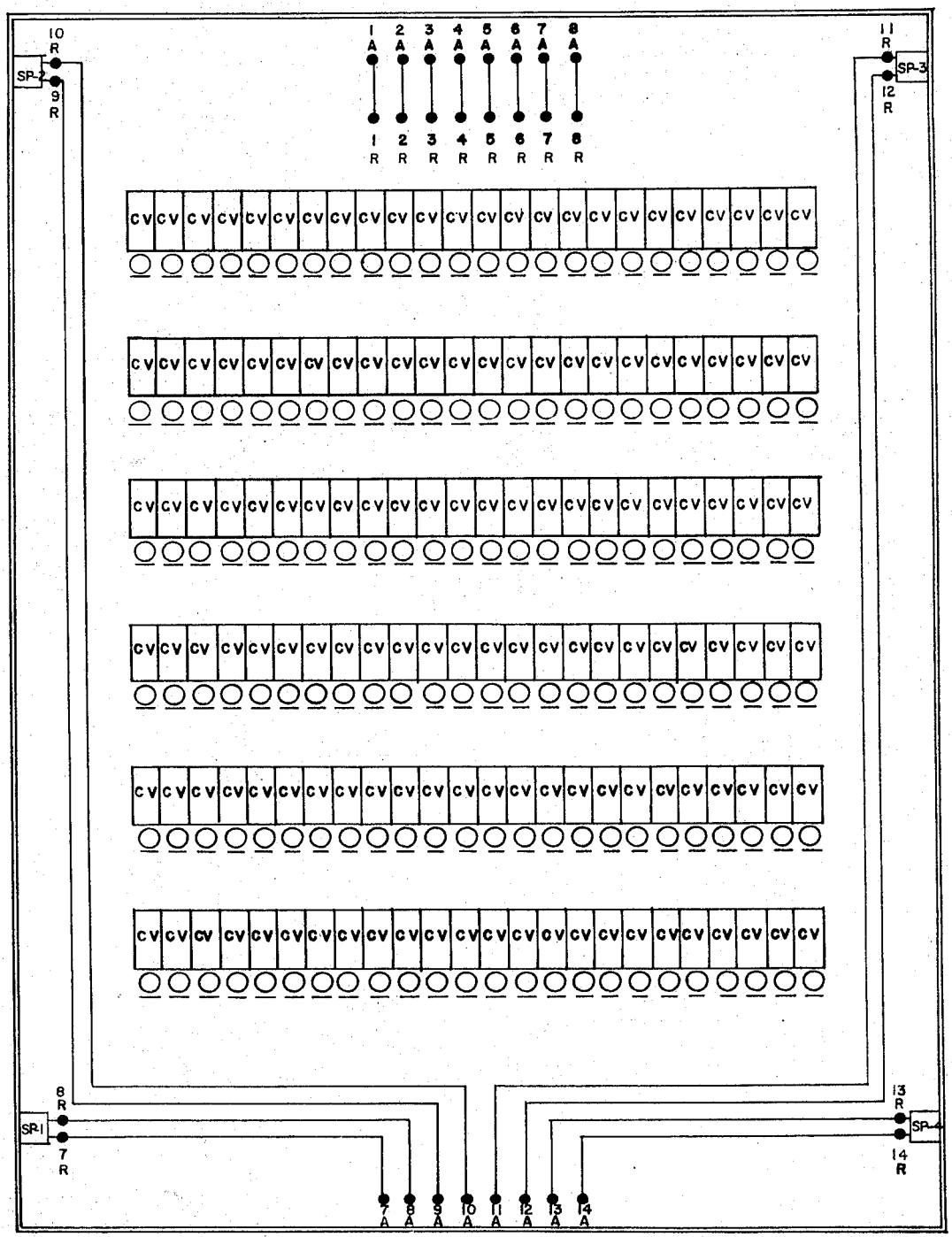
Figure 3:
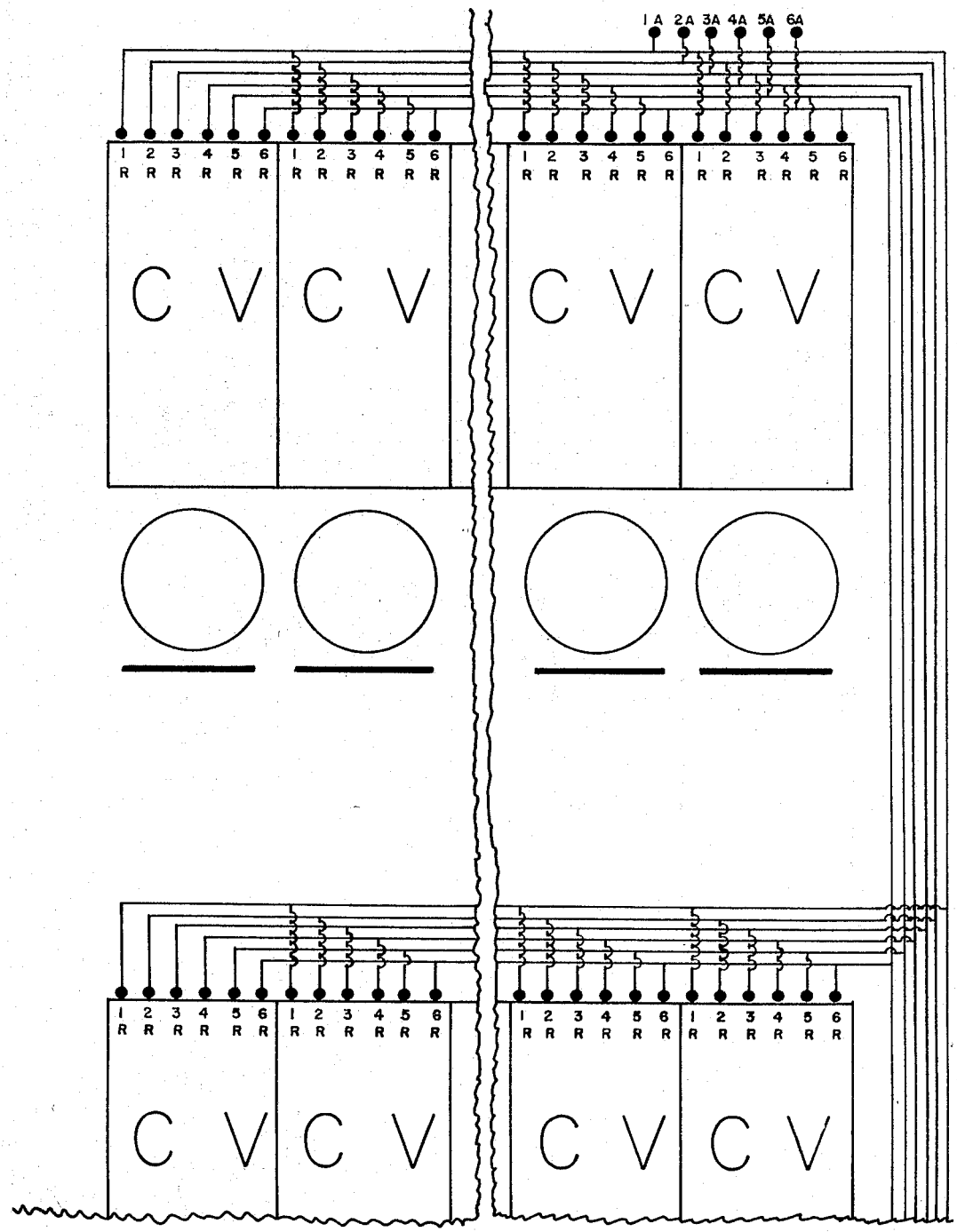
Figure 6:
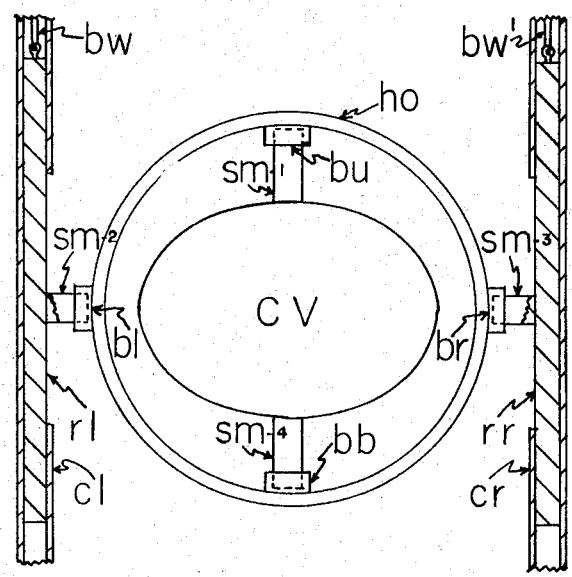

It has been described how the output signals may reproduce a wide-angle stereoscopic motion picture in one viewer CV of FIG. 6. It is now pointed out that output terminals 1A and 2A, 3A and 4A and 5A and 6A, may be directly shunted thousands of different directions to pick up terminals 1R and 2R, 3R and 4R and 5R and 6R, of different individual wide-angle, stereoscopic, motion picture viewers CV as is indicated by FIG. 2. There is not enough room in FIG. 2 to show the parallel circuitry required to accomplish this shunting. From observing FIG. 3 one can see that said pick up terminals 1R and 2R, 3R and 4R, and 5R and 6R of every CV set in FIG. 2 could be shunted directly to output terminals 1A and 2A, 3A and 4A, and 5A and 6A. In fact, said pick up terminals of thousands of CV sets could be shunted to said output terminals. Said output terminals could be in one building of a city and there could be said pick up terminals on several CV sets in more than half the houses in said city and said shunting could still be acomplished. It is obvious that this same type of shunting could be done from output terminals to pick up terminals 1R, 2R, 3R, 4R, 5R, 6R, 1RR, 2RR, 3RR, 4RR, 5RR, 6RR, 1RG, 2RG, 3RG, 4RG, 5RG, 6RG, 1RB, 2RB, 3RB, 4RB, 5RB, and 6RB of FIG. 11 respectively of thousands of CV–C sets.

At the same time the wide-angle stereoscopic motion pictures are being in the CV or CV–C viewers for the viewing observer in FIG. 2, stereophonic sound may be reproduced by speakers SP–1, SP–2, SP–3 and SP–4 shown in FIG. 2. This may be accomplished by shunting output terminals 7A and 8A, 9A and 10A, 11A and 12A, and 13A and 14A to pick up terminals 7R and 8R, 9R and 10R, 11R and 12R, and 13R and 14R respectively as shown in FIG. 2. It is here pointed out that the locational relationship between speakers SP–1, SP–2, SP–3, and SP–4 and each individual CV viewer and its associated potential viewing observer is approximately the same as the locational relationship as the microphones which recorded the signals therefor.

Figure 4:
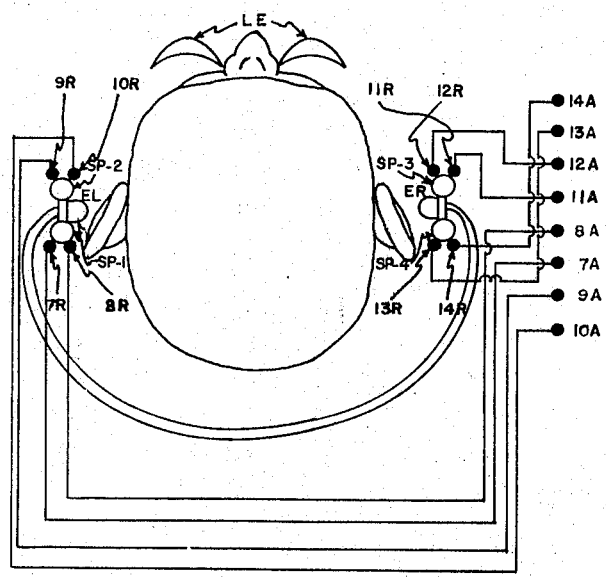

FIG. 4 illustrates another method of reproducing the stereophonic sound picked up by the microphones. As is shown in FIG. 4, SP–1 is slightly to the rear of and in close proximity to the left ear of the viewing observer viewing through lenses LE of FIGS. 1 and 4. Also SP–1 may be shunted across output terminals 7A and 8A as shown in FIG. 4 in a manner similar to that shown in FIG. 3. Further as shown in FIG. 4 SP–2 is slightly to the front of and in close proximity to the left ear of said viewing observer. Also SP–2 is shunted across output terminals 9A and 10A. Still further, as shown in FIG. 4, SP–3 is slightly to the front of and in close proximity to the right ear of said viewing observer. Said SP–3 is shunted across output terminals 11A and 12A as shown in FIG. 4. Lastly SP–4 is slightly to the rear of and in very close proximity to said right ear of said viewing observer and is shunted across output terminals 13A and 14A. This arrangement may obviously be made to reproduce the stereophonic sound picked up. This has the added advantage of making the direction of the CV viewers unimportant. Stereophonic sound will undoubtedly find a new usefulness in wide-angle stereoscopic motion pictures, that of musically directing the eyes of a viewing observer to the designed center of interest.

It is here pointed out that the stereophonic sound system of this application is not limited to a four track sound system. For example, it could be an eight track sound system. There could be a speaker placed directly above SP–1; one directly above SP–2; one above SP–3; and one above SP–4. This would record sound not only from northerly, easterly, southerly, and westerly directions, but also from upwardly and downwardly directions.

Figures 8, 9:
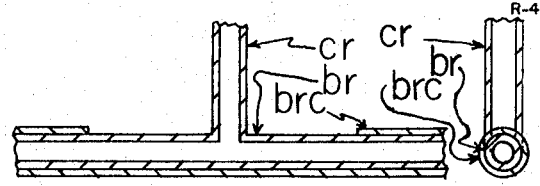

It is here pointed out that the wide angle stereoscopic motion picture viewer CV of FIG. 1 need not be designed such that it makes the viewing observer uncomfortable by not allowing him freedom of movement. Some ways to allow such freedom of movement are illustrated in FIGS. 6, 8 and 9. FIG. 6 may be visualized by imagining a vertical plane which is parallel to the plane FIG. 6 is in and passes approximately through the center of gravity of said viewer CV. Right and left rider pistons $rr$ and $rl$ respectively and right and left carrier cylinders $cr$ and $cl$ respectively are shown in cross section to show their function more clearly. Supporting means $sm$–2 and $sm$–3 have an axis which is horizontal and passes through the center of gravity of CV. Said supporting means are rigidly attached to rider pistons $rl$ and $rr$ respectively. Supporting means $sm$–2 and $sm$–3 are rotatably slipped into bearings $bl$ and $br$ which are rigidly attached to hoop $ho$, and thusly allowing hoop $ho$ to rotate about said axis of $sm$–2 and $sm$–3. Supporting means $sm$–1 and $sm$–4 are rigidly atached to said viewer CV and have a vertical axis which passes through said center of gravity of said viewer CV. Said $sm$–1 and $sm$–4 are rotatably slipped into bearings $bu$ and $bb$ respectively, said bearings being rigidly attached to hoop $ho$. Rider pistons $rl$ and $rr$ are allowed vertical reciprocating motion by carrier cylinders $cl$ and $cr$ respectively. Rider pistons $rl$ and $rr$ are supported by balancing weights through noncompressible means $bw$ and $bw'$ which counterbalance the weight of CV, $sm$–1, $sm$–2, $sm$–3, $sm$–4, $bu$, $bl$, $bb$, $br$, $ho$, $rl$, and $rr$. It is here pointed out that all said viewing observers must overcome to move CV up or down, about its vertical axis, or about its horizontal axis is momentum and friction. FIGS. 8 and 9 show the lower portion of right carrier cylinder $cr$. FIG. 9 is merely a lower extension of the view of $cr$ shown in FIG. 6. FIG. 8 is cross section of a side view of said lower extension. Carrier cylinder $cr$ is rigidly attached to base piston $br$. Right base piston $br$ of FIGS. 8 and 9 is allowed reciprocating movement in a horizontal plane toward and away from said viewing observer by the right base carrier cylinder $brc$ of FIGS. 8 and 9. The same is true of left base piston within left base carrier member, which are not shown. Therefore CV may be moved about its vertical axis, its horizontal axis which is parallel to the eyes of said viewing observer, up and down, and toward or away from said viewing observer. If bearings $bu$ and $bb$ were slidably supported by hoop $ho$, CV could be moved about its horizontal axis which is perpendicular to the eyes of said viewing observer. Therefore, said viewer CV can be made such that a viewing observer could comfortably view a lengthy wide angle stereoscopic stereophonic motion picture. Methods of adjusting lenses LE are, of course, well known.

It is here pointed out that a negatively biased grid type reticle could be used, inside the evacuated said cathode ray tube device in conjunction with two electron beams originating from two cathodes, to accomplish the same or a similar effect upon screen S–2 of FIG. 1 as reticles R–0, R–1, R–4 and in conjunction with light rays originating from two sources accomplish. It is obvious that if such a grid type reticle is used in conjunction with S–2 of FIG. 1, reticle R–4 would also have to be used; there would of course be two screens and electron beams analogous to S and $eb$ of FIG. 4 of my copending application S.N. 250,561, filed January 10, 1963. One screen for the right eye view and one screen for the left eye view.

After my invention is particularly pointed out, it becomes obvious that there are other ways of accomplishing what R–4 accomplishes in FIG. 1 (using polarized light for example). It is not the intention of applicant to imply that the only way of accomplishing his invention is that which is specifically set forth in this specification. Several obvious substitutions or matters of choice which are considered within the scope of applicant's invention are not mentioned in the above specification.

As indicated above, polarized light could obviously be used to produce the desired stereoscopic effect. One way of using polarized light may be explained after FIG. 1 is observed. Reticle R–4 of FIG. 1 could be a series of vertical, long, extremely narrow conjugately related interlined *polarizing strips*. There are two types of said polarizing strips. The first of the two said types must have its axis of polarization rotated 90 degrees from the axis of polarization of the second of the two said types. The iconoscopic polarizing reticle R–4 must be either identical or geometrically similar. Also, the relationship between the iconoscopic reticle and screen must be either identical or geometrically similar to the relationship between R–4 and S–2 respectively. One method of constructing the polarizing reticle indicated by R–4 of FIG. 1 is set forth in lines 12–63, column 1, page 5 of Athey et al., Patent No. 2,317,875, issued April 27, 1943, entitled "Stereoscopic Photography." Rather than cementing Athey's assembly 83 (which may be used as applicant's polarizing reticle R–4) to Athey's transparent flat 84 (lines 63–66 of Athey et al.), this polarizing form of applicant's reticle R–4 would be cemented to applicant's screen S–2 would give the rays leaving said right eye view strips which are reproduced upon S–2 a first axis of polarization, and the rays leaving said left eye view strips which are reproduced upon S–2 a second axis of polarization which is rotated 90 degrees from said first axis of polarization. Polarizing filter or dichroic screen 12 of FIG. 1 allows only the left eye view carrying light rays to pass through, and polarizing filter or dichroic screen 12' allows only the right eye view carrying light rays to pass through. This species of applicant's invention has the advantage that, within a small CV viewer of FIG. 1, each vertical strip may be a small made to subtend an angle much less than 1 minute at the eye of a viewing observer, without causing diffraction or interference difficulties. Since the eye cannot resolve two parallel lines with centers of separation subtending an angle of less than 1 minute of the eye, the viewing observer will see a continuous, integrated scene through lenses LE of FIG. 1.

Athey's above pointed out method of constructing R–4 makes it possible to obtain more than 3300, and possibly up to 15,000 vertical polarizing strips per horizontal inch. (See Jenkins and White, Fundamentals of Optics, third edition, McGraw-Hill Book Co., Inc., New York, Toronto, and London, page 342—Fig. 17J(b).) and line 3, column 1, page 5 of Athey et al. Therefore, screen S–2 could be made to have a horizontal dimension of less than 9 inches and still give each eye of a viewing observer a horizontal and vertical angle of view of some 160°, which appears as a continuous integrated image to the normal eye.

Further information as to the well known electronics necessary for reproducing the image cast upon screens S or SG, SB, and SR upon either S–2 or the screen of CV-C may be found in Milton S. Kiver "Television Simplified," 6th edition, D. Van Nostrand Co., Inc., Princeton, New Jersey, New York, 1962.

What is claimed is:

1. A cathode ray tube optical viewing device for reproducing wide angle stereoscopic stereophonic portrayals comprising: an enclosed, hollow casing, one portion of said casing being adapted to fit adjacent the face of a viewing observer, said one portion having two ocular openings, a means to support said ocular openings in position to be looked through by a viewing observer, said means allowing said viewing device to be moved laterally, vertically, and forwardly and rearwardly, and to be rotated about the vertical axes and both horizontal axes, one television unit having a single screen mounted within said casing, a left eye view wide angle motion picture image being reproduced on said screen by said television unit, optical means making said left eye view image visible only through the left of said ocular openings, a right eye view wide angle motion picture image being reproduced on said screen in partially overlapped relation with said left eye view image, said optical means making said right eye view image visible only through the right of said ocular openings, said overlapped relation making possible extremely wide angle viewing, oculars mounted in each of said ocular openings, speakers being arranged to reproduce sound from four different directions, said television unit, said screen, said optical means, said oculars, and said speakers co-operating together to recreate a portrayal through the sense of wide angle stereoscopic viewing and the sense of four directional stereophonic hearing.

2. Apparatus for obtaining the unified result of: the converting of electrical signals into the re-creation of a unified portrayal before a multiplicity of viewing observers through the sense of stereoscopic extremely wide peripheral vision and the sense of four directional stereophonic hearing comprising: an auditorium, a multiplicity of cathode ray tube optical viewing devices within said auditorium, each of said devices facing the same direction, means to convey video electrical signals to each of said devices, each comprising means for converting the video electrical signals into wide angle images, wide angle ocular lenses, said ocular lenses coacting with said images whereby the visual rays of said portrayal are re-created to enter the eyes of each observer at very wide angles, a speaker being in the forward left hand corner of said auditorium, a second speaker being in the forward right corner of said auditorium, a third speaker being in the rearward right corner of said auditorium, a fourth speaker being in the rearward left corner of said auditorium, means to convey audio electrical signals to said first, second, third, and fourth speakers, said multiplicity of cathode ray tube optical viewing devices and said first, second, third, and fourth speakers co-operating together to recreate a unified portrayal before a multiplicity of viewing observers through the sense of extremely wide peripheral vision and the sense of four directional stereophonic hearing.

3. The apparatus of claim 2 wherein: each of said multiplicity of cathode ray tube optical viewing devices comprises: an enclosed, hollow casing, one portion of said casing being adapted to fit adjacent the face of a viewing observer, said one portion having two ocular openings, a means to support said ocular openings in position to be looked through by said viewing observer, said means allowing each said viewing device to be moved laterally, vertically, and forwardly and rearwardly, and to be rotated about the vertical axes and two perpendicular horizontal axes, one television unit having a single screen mounted within said casing, a left eye view wide angle motion picture image being reproduced on said screen by said television unit, optical means making said left eye view image visible only through the left of said ocular openings, a right eye view wide angle motion picture image being reproduced on said screen in partially overlapped relation with said left eye view image, said optical means making said right eye view image visible only through the right of said ocular openings, said overlapped relation making possible extremely wide angle viewing, oculars mounted in each of said ocular openings, said television unit, said screen, said optical means, and said oculars co-operating together to re-create said portrayal through the sense of wide angle stereoscopic viewing.

4. Apparatus for obtaining the unified result of: the converting of electrical signals into the re-creation of a unified portrayal before a multiplicity of viewing observers through the sense of stereoscopic extremely wide peripheral vision and the sense of eight directional stereophonic hearing comprising: an auditorium, a multiplicity of cathode ray tube optical viewing devices within said auditorium, each of said devices facing the same direction, means to convey video electrical signals to each of said devices, each comprising means for converting the video electrical signals into wide angle images, wide angle ocular lenses, said ocular lenses coacting with said images whereby the visual rays of said portrayal are re-created to enter the eyes of each observer at very wide angles, a first speaker being in the forward lower left hand corner of said auditorium, a second speaker being in the forward upper left hand corner of said auditorium, a third speaker being in the forward lower right hand corner of said auditorium, a fourth speaker being in the forward upper right hand corner of said auditorium, a fifth speaker being in the rearward lower right hand corner, a sixth speaker being in the rearward upper right hand corner of said auditorium, a seventh speaker being in the rearward lower left hand corner of said auditorium, and an eighth speaker being in the rearward upper left hand corner of said auditorium, means to convey independent audio electrical signals to said first, second, third, fourth, fifth, sixth, seventh, and eighth speakers, said multiplicity of cathode ray tube optical viewing devices and said first, second, third, fourth, fifth, sixth, seventh, and eighth speakers co-operating together to re-create a unified portrayal before a multiplicity of viewing observers through the sense of extremely wide peripheral vision and the sense of eight directional stereophonic hearing.

5. The apparatus of claim 4 wherein: each of said multiplicity of cathode ray tube optical viewing devices comprises: an enclosed, hollow casing, one portion of said casing being adapted to fit adjacent the face of a viewing observer, said one portion having two ocular openings, a means to support said ocular openings in position to be looked through by said viewing observer, said means allowing each viewing device to be moved laterally, vertically, and forwardly and rearwardly, and to be rotated about the vertical axis and two perpendicular horizontal axes, one television unit having a single screen mounted within said casing, a left eye view wide angle motion picture image being reproduced on said screen by said television unit, optical means making said left eye view image visible only through the left of said ocular openings, a right eye view wide angle motion picture image being reproduced on said screen in partially overlapped relation with said left eye view image, said optical means making said right eye view image visible only through the right of said ocular openings, said overlapped relation making possible extremely wide-angle viewing, oculars mounted in each of said ocular openings, said television unit, said screen, said optical means, and said oculars co-operating together to re-create said portrayal through the sense of wide angle stereoscopic viewing.

References Cited by the Examiner
UNITED STATES PATENTS

| | | | |
|---|---|---|---|
| 2,107,464 | 2/1938 | Zworykin | 178—6.5 |
| 2,301,254 | 11/1942 | Carnahan | 178—6.5 |
| 2,642,487 | 6/1953 | Schroeder | 178—7.86 |
| 2,701,503 | 2/1955 | Calvi | 178—6.5 |
| 2,783,406 | 2/1957 | Vanderhooft | 178—6.5 |
| 2,931,855 | 4/1960 | Abramson | 178—5.4 |
| 2,955,156 | 10/1960 | Heiling | 178—6.5 |
| 2,969,426 | 1/1961 | Moulton | 178—5.4 |
| 3,020,341 | 2/1962 | Owens | 178—6.5 |
| 3,045,544 | 7/1962 | Schmidt | 88—57 |

DAVID G. REDINBAUGH, *Primary Examiner.*

T. G. KEOUGH, J. A. ORSINO, *Assistant Examiners.*